(No Model.)
E. J. REA.
VALVE.
No. 564,291. Patented July 21, 1896.
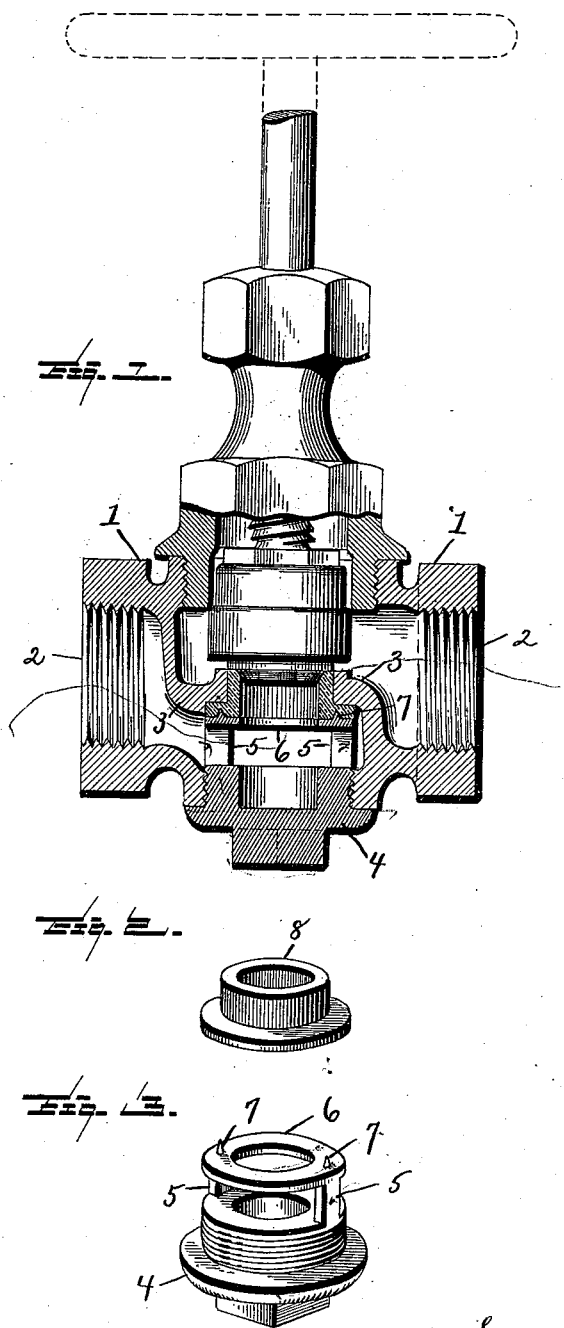

UNITED STATES PATENT OFFICE.

EDWARD J. REA, OF WASHINGTON, DISTRICT OF COLUMBIA.

VALVE.

SPECIFICATION forming part of Letters Patent No. 564,291, dated July 21, 1896.

Application filed December 22, 1892. Serial No. 456,004. (No model.)

*To all whom it may concern:*

Be it known that I, EDWARD J. REA, a citizen of the United States, residing at Washington, in the District of Columbia, have invented a certain new, useful, and valuable Improvement in Valves, of which the following is a full, clear, and exact description.

My invention has relation to improvements in valves, the essential novel feature of which consists of a removable plug being provided with an interchangeable seat. The said seat is the part which is subject to wear by the passage of the steam or other element, and when one seat is worn it can be readily removed and replaced by a new one.

In the accompanying drawings, Figure 1 is a side plan view, partly in section, of my invention. Fig. 2 is a perspective view of the interchangeable seat, and Fig. 3 is a perspective view of the removable plug.

My invention is described as follows:

My improvement is applied to the ordinary globe-valve, and in the accompanying drawings Fig. 1 represents such a valve.

The part 1 represents the body portion of the valve, having the two opposite threaded points of connection 2 2 and the usual internal partition 3. The valve is also provided with the usual bonnet and stem with a bib on the lower end thereof, and turning disk on the upper end.

The plug 4 is screwed in the bottom of the body of the valve, and said plug is provided on its top with the uprights 5, which are connected at their upper ends by the perforated plate 6, said plate having on its upper surface the projections 7. The plug, uprights, plate, and projections can all be cast in one piece or made and put together in separate pieces, as is deemed desirable.

The interchangeable seat consists of a hollow cylinder 8, having the flange 9 at its bottom, the under side of the said flange being provided with suitable indentations to receive the projections 7. (See Fig. 1.) The top of the cylinder 8 can be beveled to the center, as shown in Fig. 1, or it can be horizontal, as shown in Fig. 2. The interchangeable seat fits by a ground joint in a perforation in the partition 3, the upper edge of the seat being flush with or extending slightly beyond the top surface of the partition. The passage of the steam or other element is from one pipe connecting with the valve up through the perforation of plate 6, through the hollow of cylinder 8, beyond the interchangeable seat to the other connecting-pipe, and vice versa.

To check the flow of the element the stem of the valve is turned in the ordinary manner, and the bib on the lower end thereof is brought closer to the interchangeable seat. When the bib engages the seat, the flow of the element is stopped.

It will be seen that the wear in the passage of the element will come principally on the interchangeable seat, and when this seat is worn out or becomes leaky it is but the work of a few minutes to remove the plug and substitute a new seat for the defective one.

The seats can be made of any material adapted to such use.

Having thus described my invention, what I claim as new, and desire to secure by Letters Patent, is—

1. In a valve having a partition with a perforation therein a reciprocating bib located above said perforation, a single removable lining made of a hardened and different material than that of the valve-body, said lining having an integral flange extending beyond its outside periphery, the lining located in the perforation of the partition and covering the entire perpendicular sides thereof, the flange resting against the under side of the partition, a removable plug located in the bottom of the valve and having an extension adapted to impinge the lining-flange against the under side of the partition, no part of said plug or its extension coming in contact with the partition said lining adapted to receive the entire friction of the fluid while passing through the partition and also while passing between the bib and the perforation, said reciprocating bib engaging the said removable lining alone when the valve is closed, as set forth.

2. In a valve having a partition with a perforation therein and a reciprocating bib located above the perforation, a disconnected lining located in the perforation under the bib, the bib engaging the lining alone when the valve is closed, a removable plug located in the bottom of the valve and having an extension supporting the lining in such manner as to bring the strain when the valve is closed on the top and the bottom of the same, no part of the plug or its extension coming in contact with the valve-partition as set forth.

In testimony whereof I affix my signature in presence of two witnesses.

EDWARD J. REA.

Witnesses:
 A. E. GLASCOCK,
 BENJ. T. WELCH, Jr.